Apr. 3, 1923.
T. MIDGLEY
1,450,328
JACKET FOR PRELIMINARY CURE
Original Filed Aug. 4, 1920
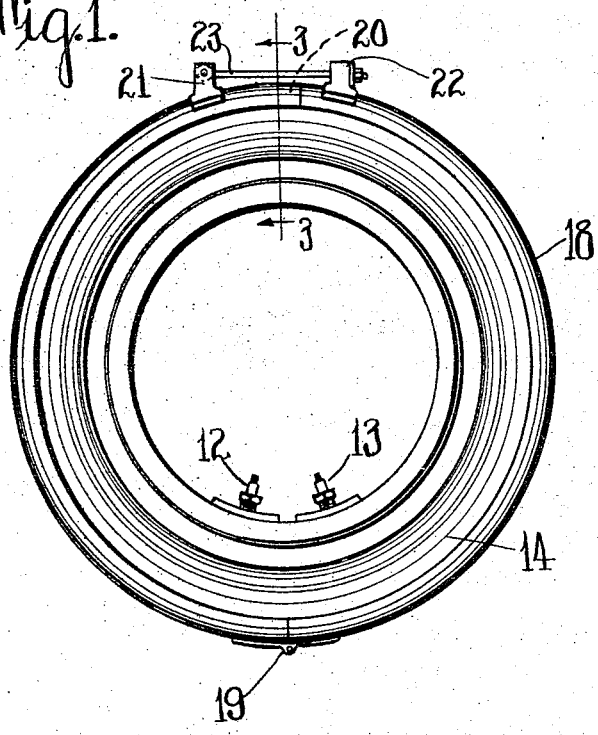
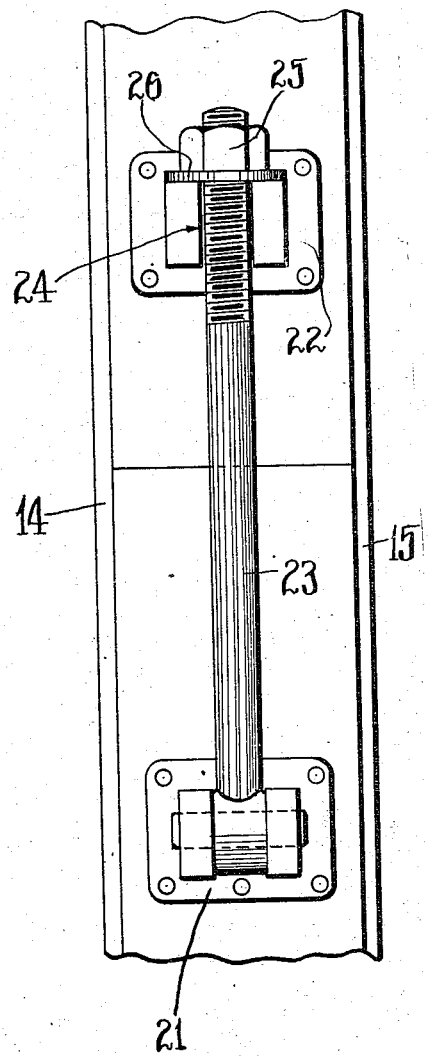
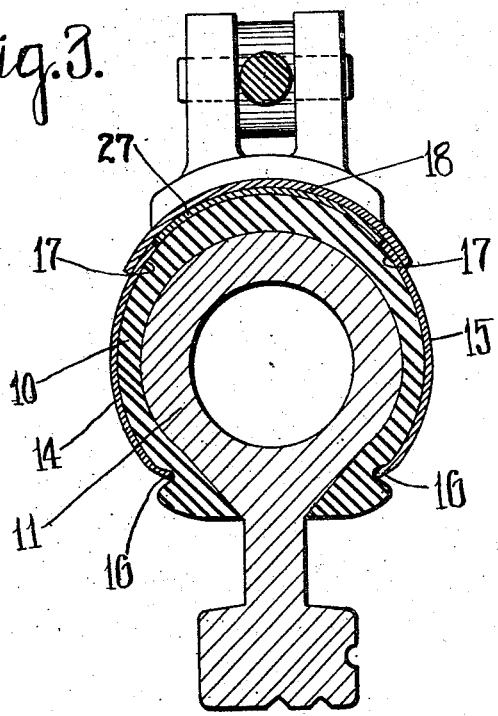
INVENTOR
Thomas Midgley.
BY
Edward C Taylor
ATTORNEY Patented Apr. 3, 1923.

1,450,328

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

JACKET FOR PRELIMINARY CURE.

Application filed August 4, 1920, Serial No. 401,217. Renewed September 7, 1922. Serial No. 586,799.

*To all whom it may concern:*

Be it known that I, THOMAS MIDGLEY, a citizen of the United States of America, residing at Hampden, in the county of Hampden and State of Massachusetts, have invented certain new and useful Improvements in a Jacket for Preliminary Cure, of which the following is a specification.

My invention relates to molds for use in the vulcanization of tire casings. It has for its object a mold which will be light in construction and at the same time serve to create an even bonding pressure on the sides and tread portions of the carcass. It has for a particular object a mold adapted for use with a vulcanizing process in which a preliminary vulcanization is effected by heating the core on which the casing is mounted while the outside of the casing is held by a bonding pressure. My invention will now be described with particular reference to the accompanying drawings, in which—

Fig. 1 is a side elevation showing my improved mold in place upon the tire casing mounted on a core;

Fig. 2 is an enlarged fragmentary top plan view of the same; and

Fig. 3 is a section on line 3—3 of Fig. 1.

In Fig. 3 a tire casing 10 is shown as mounted on a core 11 which may be of any usual or desired type on which for the practice of the method referred to above is preferably provided with connections 12 and 13 whereby steam or other heating medium may be supplied to the interior of the core. The mold itself comprises side plates 14 and 15, shaped to conform with the sides of the tire casing and in the case of a tire of the clincher type so shaped as to fit snugly adjacent the bead, as at 16. These members may be provided with a scarfed lap joint if desired to permit of a slight contraction, but for most purposes this is not necessary. Surrounding the tread portion of the casing and formed to bear against the top portions 17 of the side members is a member 18 preferably hinged at 19 and having a scarfed lap joint at 20 whereby this member may be contracted and still preserve a smooth interior surface. For contracting this tread member lugs 21 and 22 are secured thereto on opposite sides of the lap joint. To lug 21 is pivoted a threaded rod 23 adapted to fit in a slot 24 in lug 22 and having a nut 25 and a washer 26 by which the two lugs may be drawn toward each other as will be readily understood.

In use the side members 14 and 15 are applied to the sides of the tire, tread member placed in position, and nut 25 tightened until the desired pressure is obtained. In order to furnish suitable pressure upon the tread portion of the tire a band 27 adapted to fit snugly between the side members is secured in any suitable way to the tread member. During the vulcanizing operation, which is preferably only partial and carried out by means of a heating medium supplied to the core, the mold will cause all portions of the casing to be held firmly together with a bonding pressure preventing separation of the plies of material and securing thorough adhesion of the various elements of the casing. After this partial vulcanization the mold may be removed and the vulcanization completed in a mold having a suitable pattern for impressing a non-skid tread or the like on the casing, and vulcanization completed. If desired, however, vulcanization may be completed in the mold forming my present invention and for this purpose member 27 may, if desired, have impressed thereto a suitable non-skid pattern. It will be further understood that, if desired, my improved mold may be used in vulcanization methods in which the heat is supplied externally instead of internally.

I claim:

1. A mold for use with tire casings comprising side members, a member extending around the tread of the tire and constructed and arranged to overlap the side members whereby as it is contracted it will press the side members against the sides of the tire, and means for contracting the tread member.

2. A mold for use with tire casings of the type having members adapted to bear against the sides of the casing, and a third member adapted to be contracted against the tread of the casing, characterized by a construction and arrangement of said members in which the contraction of the tread member will press the side members against the casing.

3. In a mold for use with tire casings, the combination of a pair of members formed to the configuration of the side of the casing, a contractible member shaped to bear against that portion of the casing between the side members and having portions overlapping the side members whereby contraction of the second-named member will press the first-named members against the sides of the casing, and means for contracting the second named-member.

THOMAS MIDGLEY.